(12) United States Patent
Murata et al.

(10) Patent No.: US 10,281,272 B2
(45) Date of Patent: May 7, 2019

(54) OPTICAL SYSTEM THAT WIDENS AN IMAGE CAPTURE VIEW ANGLE

(71) Applicant: HITACHI AUTOMOTIVE SYSTEMS, LTD., Hitachinaka-shi, Ibaraki (JP)

(72) Inventors: Seiji Murata, Tokyo (JP); Keiichi Betsui, Tokyo (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 2 days.

(21) Appl. No.: 15/522,616

(22) PCT Filed: Oct. 27, 2015

(86) PCT No.: PCT/JP2015/080155
§ 371 (c)(1),
(2) Date: Apr. 27, 2017

(87) PCT Pub. No.: WO2016/068095
PCT Pub. Date: May 6, 2016

(65) Prior Publication Data
US 2017/0314917 A1    Nov. 2, 2017

(30) Foreign Application Priority Data
Oct. 29, 2014    (JP) ................................ 2014-219852

(51) Int. Cl.
*H04N 7/18*    (2006.01)
*G01C 3/06*    (2006.01)
(Continued)

(52) U.S. Cl.
CPC ............... *G01C 3/06* (2013.01); *G02B 7/30* (2013.01); *G02B 13/00* (2013.01); *G02B 13/18* (2013.01); *G03B 15/00* (2013.01); *H04N 5/2258* (2013.01)

(58) Field of Classification Search
CPC ........................................................ G01C 3/06
(Continued)

(56) References Cited

U.S. PATENT DOCUMENTS 6,128,145 A    10/2000  Nagaoka
2004/0179100 A1*    9/2004  Ueyama ................. H04N 7/183
348/152
(Continued)

FOREIGN PATENT DOCUMENTS

EP    2562577 A1    2/2013
JP    2000-221391 A    8/2000
(Continued)

OTHER PUBLICATIONS

International Search Report for WO 20161068095 A1, dated Feb. 16, 2016.
(Continued)

*Primary Examiner* — Leron Beck
(74) *Attorney, Agent, or Firm* — Volpe and Koenig, P.C.

(57) ABSTRACT

Provided is a technology which is suitable for both widening an image capture view angle and securing an angular resolution across the entire image capture range. In an imaging optical system, a rate of change of an image height per view angle, i.e. $dy/d\theta$, is greater than 0 at a maximum view angle $\theta max$, a rate of change of a view angle per image height, i.e. $D(\theta)=1/(dy(\theta)/d\theta)$, satisfies an expression $D(\theta p) > \{(D(\theta max)-D(0))/\theta max\theta\}\theta p+D(0)$, with $\theta p$ which lies in a range of $0<\theta<\theta max$, and it satisfies an expression $1.5<(y(\theta s)/\theta s)/\{(y(\theta max)-y(\theta s))/(\theta max-\theta s)\}<3.0$ with a switching view angle $\theta s$ of the rate of change $D(\theta)$ of the view angle per image height.

6 Claims, 12 Drawing Sheets

(51) Int. Cl.
  *G02B 7/30* (2006.01)
  *G02B 13/00* (2006.01)
  *G02B 13/18* (2006.01)
  *G03B 15/00* (2006.01)
  *H04N 5/225* (2006.01)

(58) Field of Classification Search
  USPC .......................................................... 348/135
  See application file for complete search history.

(56) References Cited

U.S. PATENT DOCUMENTS

| | | | |
|---|---|---|---|
| 2004/0189831 A1* | 9/2004 | Shibatani | H04N 5/232 348/240.99 |
| 2004/0257677 A1* | 12/2004 | Matsusaka | G02B 9/58 359/783 |
| 2005/0083427 A1 | 4/2005 | Imoto | |
| 2011/0013070 A1* | 1/2011 | Hirao | G02B 7/008 348/340 |
| 2013/0050405 A1 | 2/2013 | Masuda et al. | |

FOREIGN PATENT DOCUMENTS

| | | |
|---|---|---|
| JP | 2004-354572 A | 12/2004 |
| JP | 2005-110207 A | 4/2005 |
| JP | 2006-343545 A | 12/2006 |
| JP | 2009-058648 A | 3/2009 |
| JP | 2010-003014 A | 1/2010 |
| JP | 2013-045089 A | 3/2013 |

OTHER PUBLICATIONS

Extended European Search Report dated May 7, 2018 for the European Patent Application No. 15855873.4.
Japanese Office Action dated Jan. 8, 2019 for the Japanese Patent Application No. 2016-556565.

* cited by examiner

OPTICAL SYSTEM THAT WIDENS AN IMAGE CAPTURE VIEW ANGLE

TECHNICAL FIELD

The present invention relates to an optical system, an image capturing device and a distance measuring system.

BACKGROUND ART

With a general image capturing device, the projection method expressing the relationship of a half view angle θ and an image height y adopts an imaging optical system having a perspective projection expressed substantially as $y(\theta) = f*\tan\theta$ by using a paraxial focal length f of the imaging optical system. Distortion is sometimes corrected as needed. With the foregoing perspective projection method, change in the image height per unit view angle tends to increase considerably at the wide angle side that is separated from the optical axis of the imaging optical system. Accordingly, in order to widen the image capture range, a large imaging element (image sensor) is required to capture the image height y. For instance, if the maximum view angle of image capture is 90°, since the image height y will diverge, an infinitely large imaging element will be required, and an imaging optical system cannot be realized. Thus, as a projection method of capturing images at a wide angle with a finitely large imaging element, orthogonal projection $y(\theta) = f*\sin\theta$ is known. With the foregoing orthogonal projection method, even if the half view angle θ is 90°, since the image height y is finite, an image can be formed on the imaging element. According to the foregoing projection method, an image can be formed on the imaging element up to the half view angle being 90°. As a projection method for capturing images at a wider view angle than the foregoing orthogonal projection, there is an optical system having projection characteristics expressed with the expression $y = a*f*\sin(b*\theta)$. Here, $0 < a < \sin\theta_{max}$, $b = \pi/(2*\theta_{max})$, f: paraxial focal length of entire system, θ: half view angle (diagonal view angle of radian unit), $\theta_{max}$: maximum half view angle (diagonal view angle of radian unit), and y: actual image height on the light-receiving surface of the imaging element (refer to PTL 1).

CITATION LIST

Patent Literature

PTL 1: Japanese Laid-Open Patent Publication No. 2004-354572

SUMMARY OF THE INVENTION

Technical Problem

For example, with a projection method such as orthogonal projection in which images can be captured at a relatively wide view angle, the periphery of the image becomes more compressed than the center of the image when formed on the imaging element, and the periphery of the image tends to lose more information volume than the center of the image. When focusing on the rate of change of the image height per unit view angle in orthogonal projection, since it is $dy(\theta)/d\theta = f*\cos\theta$, it can be understood that the periphery of the image is smaller relative to the center of the image. To put it differently, the periphery of the image has a greater angle variation per unit image height than the center of the image. This indicates that the image is compressed at the periphery, and implies that information per unit pixel is being lost on the imaging element.

When this kind of optical system is used, while images can be captured at a wide view angle, there are cases where an image with a compressed periphery would be undesirable. In the foregoing case, it would be possible to enlarge, among the captured image data, the image data which was optically compressed and captured and corresponds to the periphery of the image, which is an area with a large view angle, via post-processing. However, interpolation is required since information has been lost, and there is a problem in that the image will deteriorate even if it is enlarged. As an extreme example, when the half view angle θ=90°, the amount of change of the image height per unit view angle is 0, and it can be understood that there is no resolution of the half view angle θ that can be expressed with the pixels on the imaging element, and the amount of imaging information near θ=90° is small. In the configuration described in PTL 1 having an even wider view angle, considered is the amount of change of the image height per view angle, i.e. $dy(\theta)/d\theta$. In other words, $dy(\theta)/d\theta = a*f*b*\cos(b*\theta)$, and when calculation is performed when the half view angle $\theta = \theta_{max}$ as the maximum view angle, the result will be $dy(\theta)/d\theta = 0$. In other words, since the change in the image height per unit view angle at the maximum view angle is 0, there is a problem in that the angular resolution of the view angle will be lost near the maximum view angle.

The present invention was devised in view of the foregoing problems encountered by the conventional technologies, and this invention provides a technology which is suitable for both widening an image capture view angle and securing an angular resolution across the entire image capture range.

Solution to Problem

The present invention is characterized in adopting the configuration described in the appended claims.

More specifically, the optical system according to the present invention is an optical system in which, in an imaging optical system, a rate of change of an image height per view angle, i.e. $dy/d\theta$, is greater than 0 at a maximum view angle $\theta_{max}$, a rate of change of a view angle per image height, i.e. $D(\theta) = 1/(dy(\theta)/d\theta)$, satisfies an expression $D(\theta D) > \{(D(\theta_{max}) - D(0))/\theta_{max}\theta\}\theta p + D(0)$, with θp which lies in a range of $0 < \theta < \theta_{max}$, and it satisfies an expression $1.5 < (y(\theta s)/\theta s)/\{(y(\theta_{max}) - (\theta s))/(\theta_{max} - \theta s)\} < 3.0$ relative to a switching view angle θs of the rate of change D(θ) of the view angle per image height.

Advantageous Effects of the Invention

According to the foregoing configuration of the present invention, even when capturing images at a wide view angle, it is possible to increase the amount of change of the image height per unit view angle more at the center of the image than at the periphery of the image while securing the amount of change of the image height per unit view angle near the maximum view angle of the imaging optical system. In other words, it is possible to both widen an image capture view angle and secure an angular resolution across the entire image capture range.

DESCRIPTION OF EMBODIMENTS

Embodiments of the present invention are now explained with reference to the appended drawings.

Embodiment 1

Figure 1:
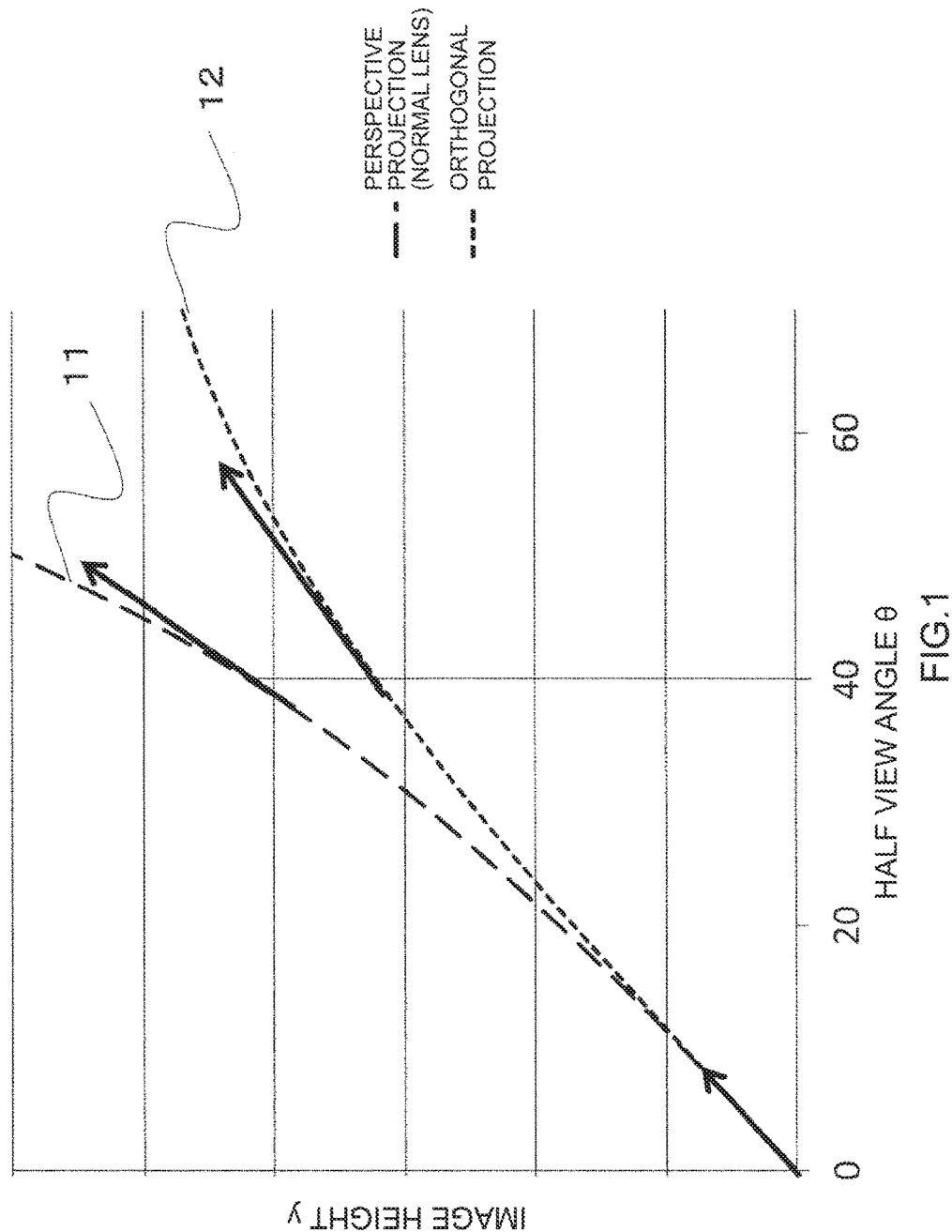
FIG. 1 is an example of the relationship of a half view angle θ and an image height y based on the projection method.

FIG. 1 is a graph showing the relationship of a half view angle $\theta$ and an image height y based on the projection method, wherein the horizontal axis shows the half view angle $\theta$ and the vertical axis shows the image height y.

Reference numeral 11 represents perspective projection, and reference numeral 12 represents orthogonal projection, and the graph is plotted under the condition where the inclination at the half view angle $\theta=0$, which is the center of the imaging range; that is, the rate of change of the image height per view angle, i.e. $dy(0)/d\theta$, becomes equal in the respective projection methods.

Both the perspective projection 11 and the orthogonal projection 12 are characterized in that the image height increases as the view angle increases, and the image height will differ depending on the projection method when the image capture view angle is determined. For instance, when the perspective projection 11 as the projection method of a generally used imaging lens is taken as an example, since the image height y is expressed as $y(\theta)=f*\tan\theta$ by using the paraxial focal length f of the imaging optical system, the image height y increases in accordance with $\tan\theta$. Accordingly, when the view angle is widened, the image height will increase, and the size of the sensitive film or the imaging element (image sensor) for forming the image thereupon needs to be increased. In particular, with the perspective projection 11, since the image height y becomes diverged when the half view angle $\theta$ is 90°, it cannot be used in applications where the half view angle $\theta$ will be 90° or more. Accordingly, a different projection method needs to be used in an optical system having a wide view angle.

As an example of a projection method of a lens having a wide view angle, there is the orthogonal projection 12. With the orthogonal projection 12, since the image height y is expressed as $y(\theta)=f*\sin\theta$, even when the half view angle $\theta$ is 90°, the image height y will not become diverged as in the perspective projection 11, and images can be captured with a finitely large sensitive film or imaging element.

Meanwhile, as the means for recording images, a sensitive film or an imaging element (image sensor) may be used at the image formation position of the imaging system. As an example, the ensuing explanation is provided on the assumption of using an imaging element which converts the optical intensity distribution of the image into electric signals.

When a CCD (Charge Coupled Device) image sensor or a CMOS (Complementary Metal Oxide) image sensor is used as the imaging element, $D(\theta)=1/(dy(\theta)/d\theta)$ represents the rate of change of the view angle per pixel. In other words, as the $D(\theta)$ is smaller, this implies that the view angle expressed with one pixel is small, and indicates a state where the resolution is high.

In light of the above, differences in the angular resolution caused by differences in the projection method are now compared. With the two projection methods, even if the inclination is the same at the center, the orthogonal projection 12 has a smaller inclination $dy(\theta)/d\theta$ in comparison to the perspective projection 11 near the half view angle 40°, which is on the side of a relatively wide view angle. In other words, even if the angular resolution is the same at the center, the angular resolution of the orthogonal projection is more degraded on the wide angle side.

Figure 2:
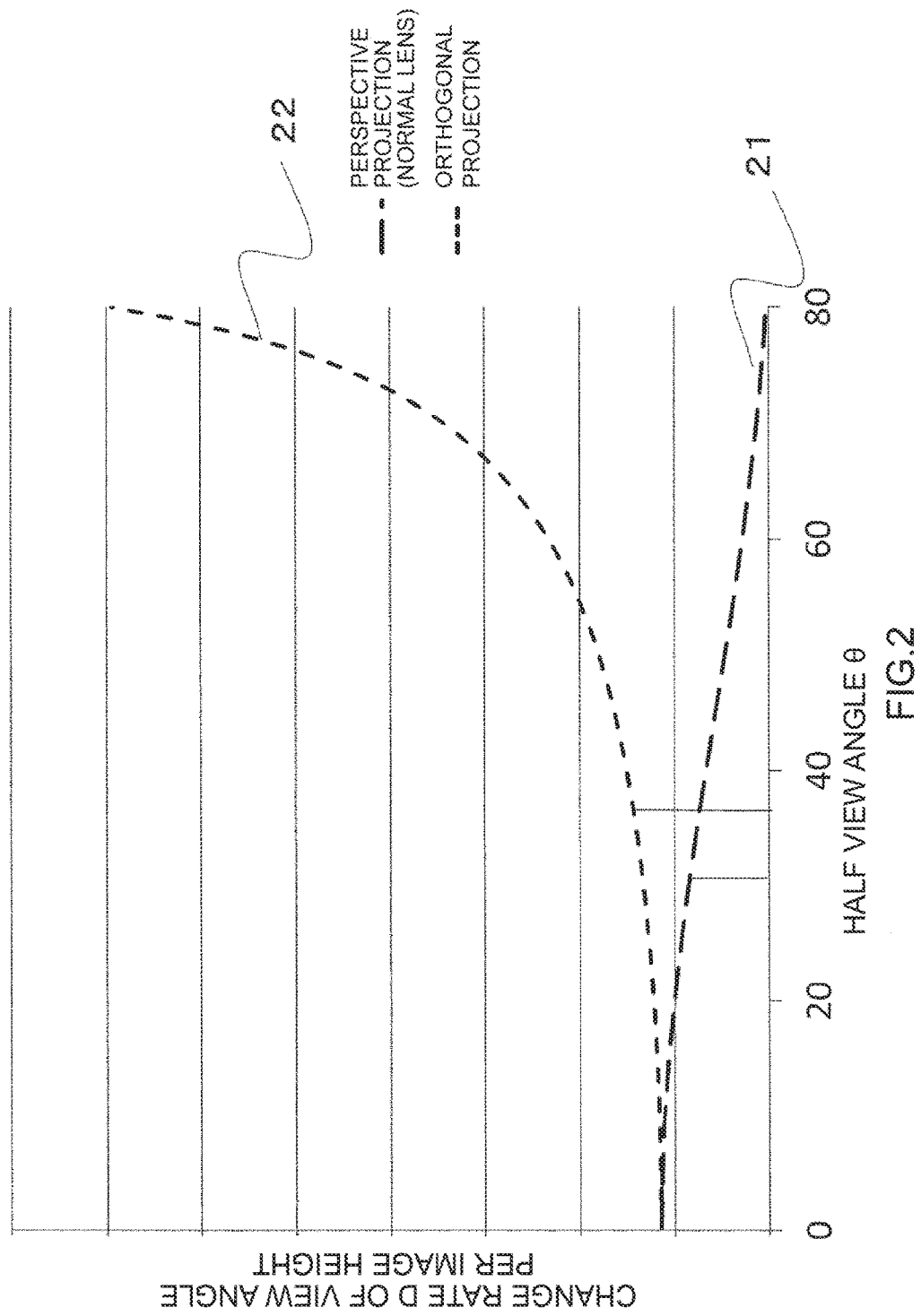
FIG. 2 is an example of the rate of change of the view angle per image height.

From a different point of view, it is also possible to perform the evaluation based on the rate of change $D(\theta)$ of the view angle per pixel at the view angle $\theta$. FIG. 2 shows the rate of change D of the view angle per image height.

While D(0) is the same, at D(40), $D(\theta)$ is greater with the orthogonal projection 22 in comparison to the perspective projection 21, and since this is a state where the rate of change of the view angle per pixel is great, it can be understood that the angular resolution is more degraded on the wide angle side.

Meanwhile, when focusing on the image height, with the perspective projection 11 of a general lens, the image height becomes considerably higher toward the wide angle side and, therefore, a large imaging element is required to capture images at a wide angle area, and there is a problem in that the cost of the imaging element will increase, and the body to which the optical system and the imaging element are fixed also needs to be enlarged, and there is a problem in that the optical system will become large.

As the performance of the imaging system, while it would be desirable to be able to capture images at a wide view angle and have a high angular resolution, as described in the comparison of the foregoing projection methods, the imaging element needs to be enlarged to widen the image capture view angle and/or increase the angular resolution. Otherwise, if the size of the imaging element is limited, degradation of the angular resolution needs to be tolerated, or the image capture range needs to be narrowed to maintain a high angular resolution.

Figure 3:
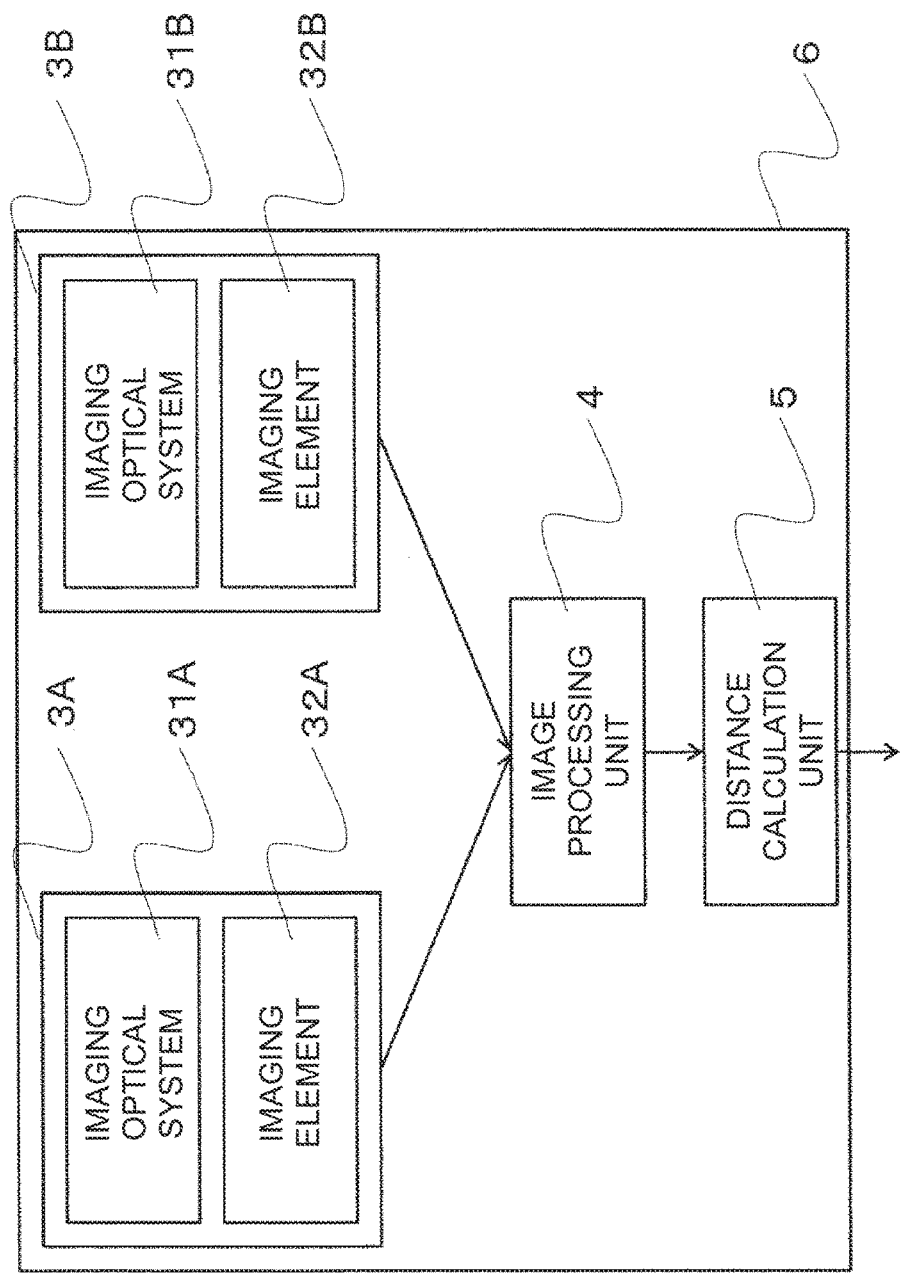
FIG. 3 is an example of a block diagram showing the configuration of the distance measuring system.

The configuration of the distance measuring (range-finding) system is now explained. FIG. 3 is a block diagram showing the configuration of the distance measuring system.

The distance measuring system comprises at least two or more imaging means 3 each configured from an imaging optical system 31 and an imaging element 32, an image processing unit 4, a distance calculation unit 5, and a body 6. In the example of FIG. 3, there are two imaging means 3 since a stereo camera is anticipated, and while the imaging means 3A and the imaging means 3B, the imaging optical system 31A, and the imaging element 32A are explained by adding a suffix, such suffix will not be added if it is not necessary to differentiate the two components.

The imaging optical system 31 is configured from a lens and other optical components. As the imaging element 32, used may be an element such as a CCD image sensor or a CMOS image sensor with a function of converting optical intensity into electric signals.

The image processing unit 4 has functions for correcting the image, such as brightness adjustment, color tone adjustment and distortion correction of the captured image so that information required for distance calculation can be extracted easily. This may be omitted depending on the quality of the obtained image or the required precision.

The distance calculation unit 5 performs processing for calculating the distance based on the images obtained from the plurality of imaging means 3.

These components are fixed on the body 6. In particular, since the arrangement relationship of the plurality of imaging means 3 is an important parameter for distance measurement, they need to be arranged with high precision. Accordingly, the body 6 is desirably configured from a highly rigid material and structure.

The distance measuring system is a system which calculates how far the object is located from the distance measuring system based on the image data obtained from the plurality of imaging means 3 that are arranged, and the position where the object exists can be calculated three-dimensionally from the information of the direction where the image capture target exists.

Figure 4:
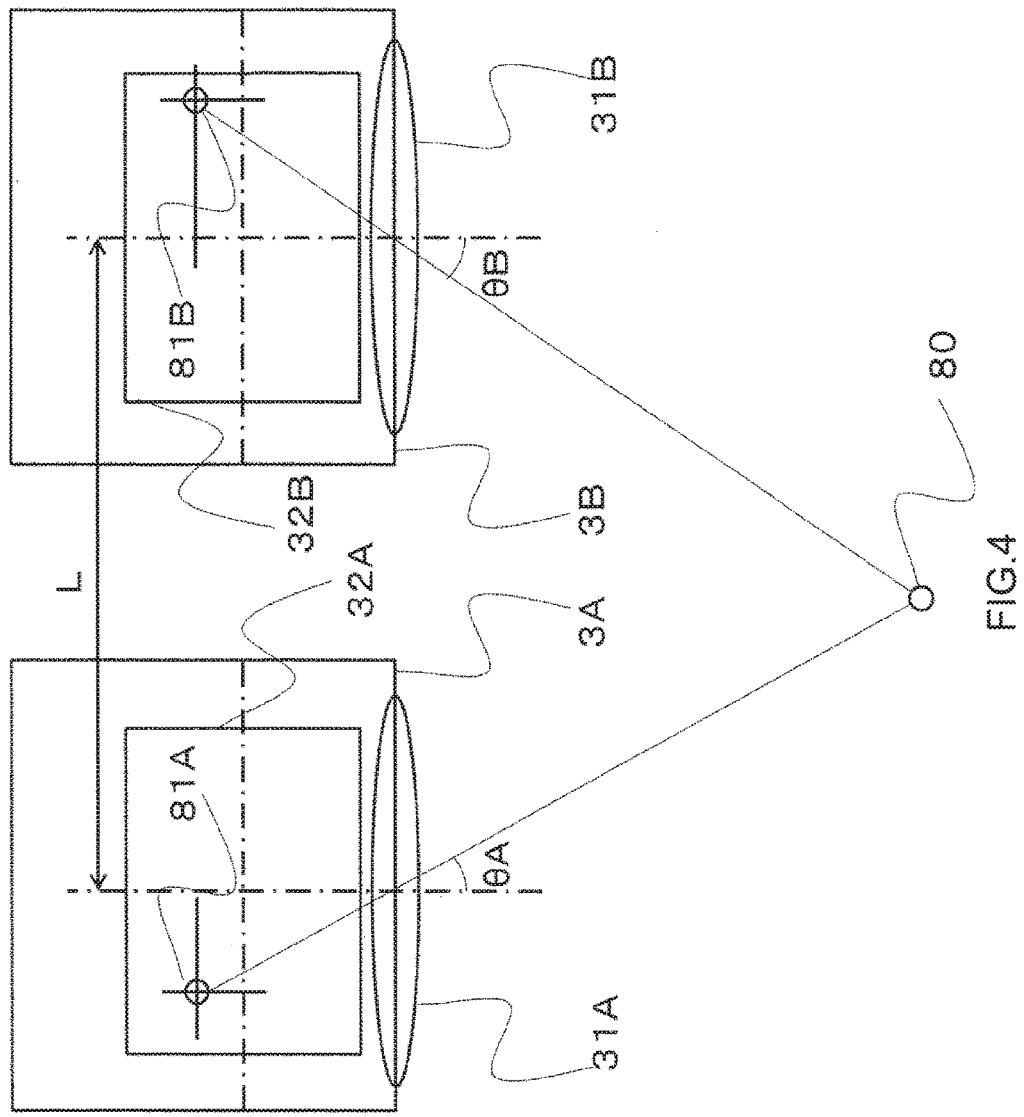
FIG. 4 is a top view of the arrangement relationship of the imaging means and the object the distance of which is measured.

FIG. 4 shows an example of the configuration of the distance measuring means.

Figure 5:
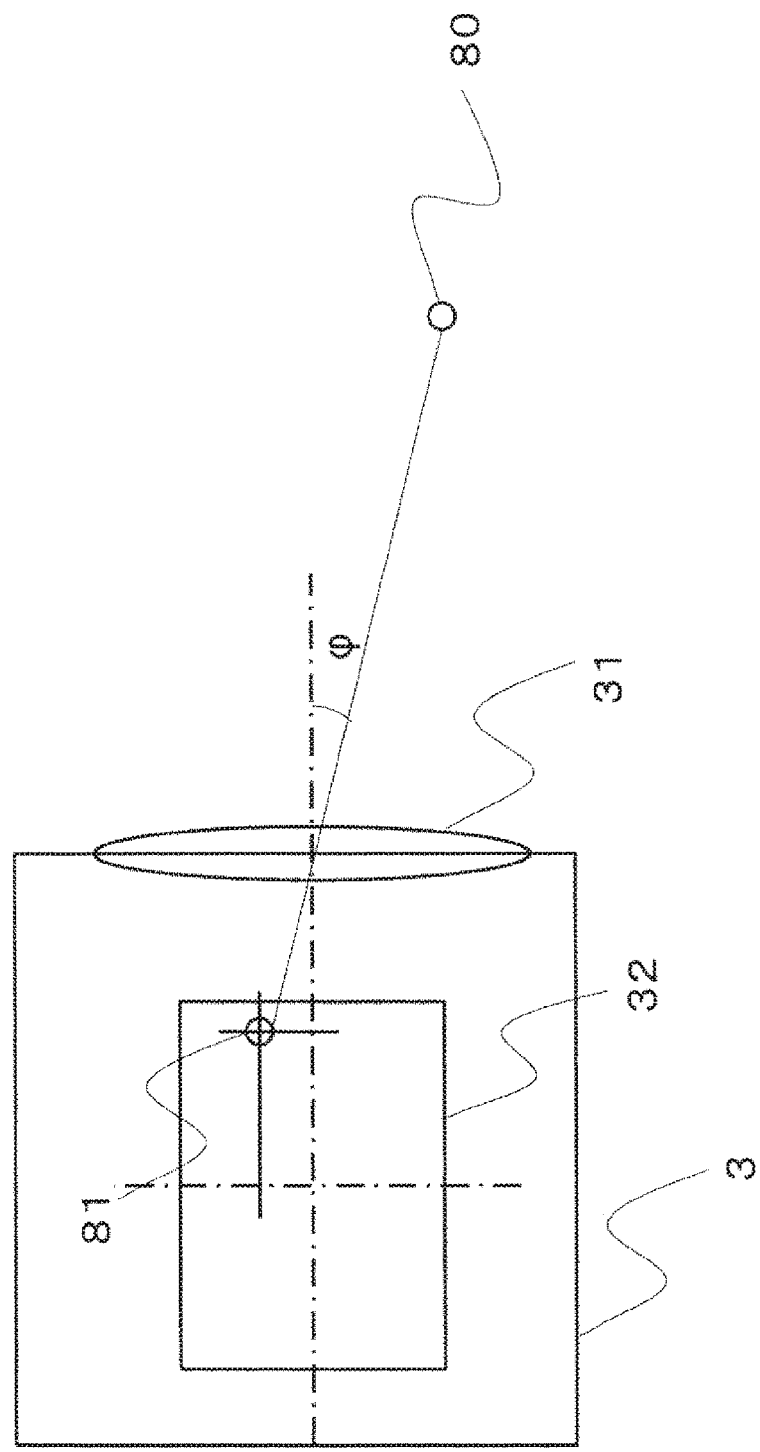
FIG. 5 is a side view of the arrangement relationship of the imaging means and the object the distance of which is measured.

FIG. 4 is a schematic diagram of the arrangement relationship of the imaging means 3 and the object 80 in which the distance is to be measured, and FIG. 5 is a side view of FIG. 4. In FIG. 5, since both imaging means 3A, B are the same, these are collectively illustrated. Moreover, while the imaging elements 32A, B in FIG. 4 and FIG. 5 are actually arranged on a plane that is perpendicular to the plane on which the diagrams are drawn, they are drawn in parallel to the plane on which the diagrams are drawn for simplifying the explanation. Moreover, the refraction of the beams of the imaging optical system 31 is not given consideration in the drawings for simplifying the explanation.

The light emitted from the object 80 is formed as an image at positions 81A, B of the imaging elements 32A, B via the imaging optical systems 31A, B. The brightness, color tone and distortion of the images obtained from the imaging means 3A, B are adjusted, and pattern matching is performed by the distance calculation unit 5. As the pattern matching method, for instance, the feature points of the respective images are extracted, and whether they are of the same object is checked by using an algorithm which verifies the geometric and topological (phase) consistency.

The horizontal angles θA, B and the elevation angle φ formed by the optical axis of the imaging optical systems 31A, B and the object 80 are obtained based on the positions 81A, B of the imaging elements 32A, B where the image of the object 80, which was determined as being the same object as a result of pattern matching, was formed, the distance between the imaging optical system 31 and the imaging element 32, and the optical properties of the imaging optical system 31. Since the distance L of the optical axis of the imaging optical systems 31A, B is fixed as a result of being fixed to the body 6, the distance to the object 80 can be obtained based on triangulation or other methods by giving consideration to the distance L, the horizontal angles θA, B, the elevation angle φ and the optical properties of the imaging optical system 31.

As described above, the direction and distance relative to the optical axis of the imaging means 3 as the feature points of the object 80 can be obtained from the image data of images captured by the imaging means 3, and the three-dimensional position of the object 80 can thereby be identified.

Here, the angular resolution and the measurable range of distance are explained with reference to FIG. 6.

Figure 6:
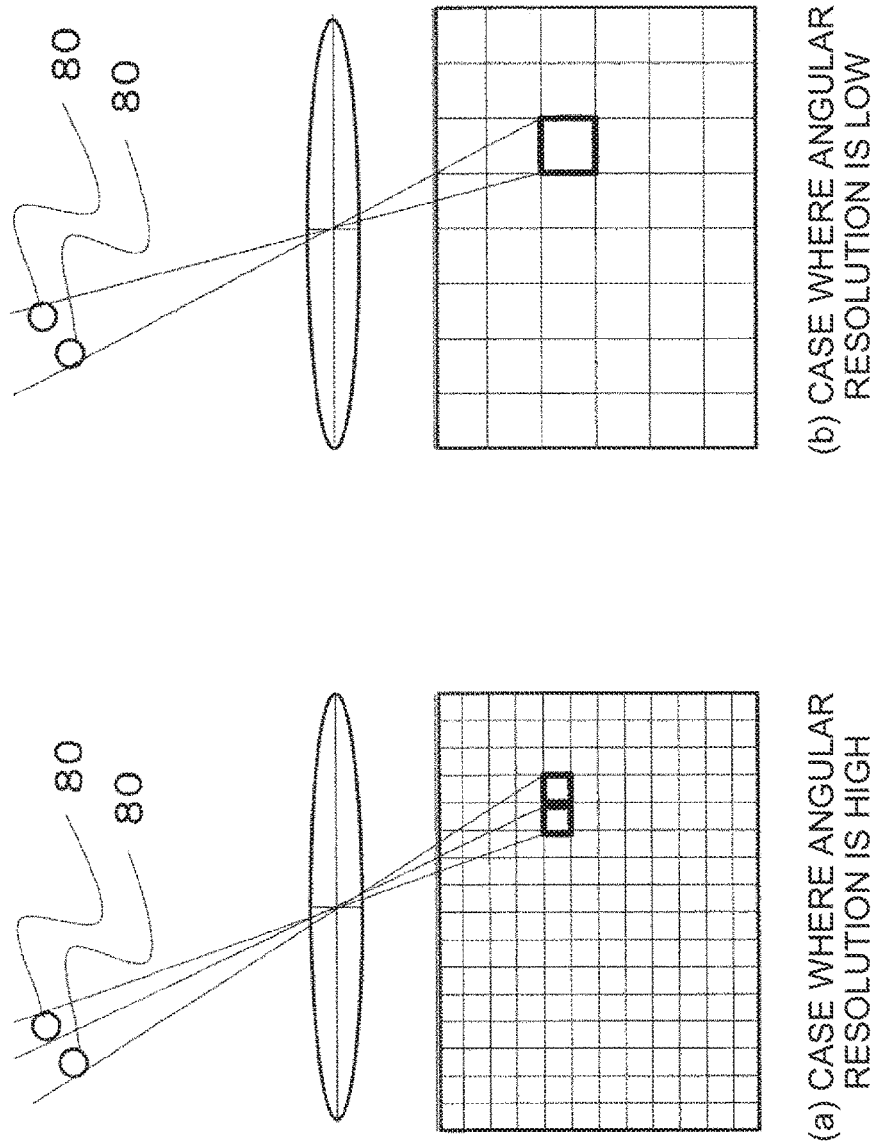
FIG. 6 is an explanatory diagram showing the relationship of the angular resolution and the object distance.

As shown in FIG. 6, the view angle expressed with one pixel has a width, and, so as long as it is within a view angle represented with a straight line, the imaging means 3 recognizes that the objects 80 exist in the same direction. For instance, if the angular resolution is high as shown in FIG. 6(a), since the view angle captured by one pixel of the imaging element 32 will be narrow, a plurality of objects 80 can be respectively recognized, and the distance measurement accuracy will improve. Nevertheless, if the angular resolution is low as shown in FIG. 6(b), since the view angle captured by one pixel of the imaging element 32 will be wide, a plurality of objects 80 cannot be recognized, and the distance to the object 80 cannot be accurately measured. Thus, it is necessary to increase the angular resolution for view angles in which the distance to the object 80 needs to be measured accurately.

In particular, when the object 80 is relatively far, since the range captured by one pixel will expand in proportion to the distance, the possibility that a plurality of objects 80 falling within a view angle captured by one pixel as shown in FIG. 6(b) will increase, and a high angular resolution is required.

Here, in order to increase the angular resolution, there are the following methods; specifically, a method of increasing the resolution of the imaging element 32 (enlargement of the size of the imaging element, densification of the pixels of the imaging element), and a method of reducing the rate of change of the view angle per unit image height in the relationship of the view angle and the image height of the imaging optical system 31. Nevertheless, there are restrictions regarding the method of increasing the resolution of the imaging element 32 since it its technically and physically difficult, and costs will increase. Thus, in this embodiment, the angular resolution at a view angle requiring accurate distance measurement was increased by changing the imaging optical system 31 as a factor that affects the angular resolution.

As an example of using the distance measuring system of this embodiment, explained is a case of mounting the distance measuring system on the front part of a vehicle. Vehicles with a function for supporting the driving of drivers or an autonomous driving function for driving the vehicle without any direct instructions from the driver are being researched and put into practical application. As an example of supporting the driving of drivers, there is a system for avoiding a collision with a vehicle or a person that darts out from the front lateral direction, or sounding a warning or applying a brake as the vehicle approaches the preceding vehicle for avoiding a collision with such preceding vehicle. Otherwise, there is also a function which causes the vehicle to follow the preceding vehicle.

In order to realize the foregoing functions, there is a method of performing determination control by using the arrangement relationship of objects existing around the vehicle, traveling direction of the vehicle, speed of the vehicle, and other information. The distance measuring system may be used for obtaining the foregoing information.

While the driving of drivers can be supported and autonomous driving can be realized by using the distance measuring system, the distance and direction to be measured and the precision of measurement will differ depending on the respective usages and functions.

Figure 7:
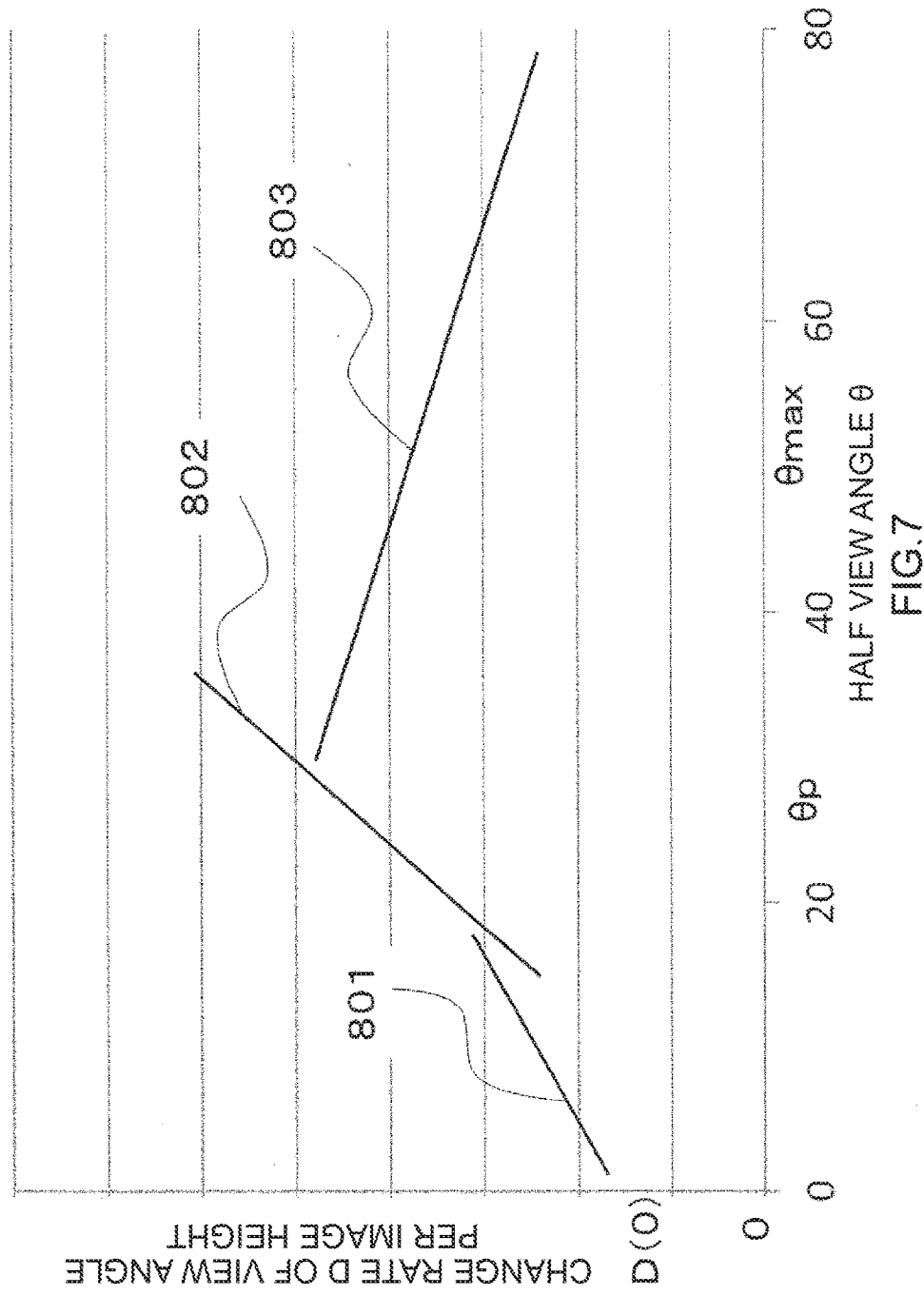
FIG. 7 is an example of the view angle and the angular resolution required based on function.

FIG. 7 shows an example of the view angle and the angular resolution required based on function.

With the function of automatically following the preceding vehicle (car-following 801), since there may be cases where the distance between two cars is relatively far such as on an expressway, an error in the distance measurement while the vehicle is driving at a fast speed will considerably affect the distance between two cars, and highly accurate distance measurement is also required near the front of the vehicle even at a far distance. Thus, the angular resolution needs to be high (D(θ) needs to be small) in an area with a small view angle. Moreover, since the effective tracking object of the wide angle side of the car-following 801 will exist at a close distance in comparison to the narrow angle side, the graph of the car-following 801 will rise to the right. Meanwhile, since it is considered that there will be no vehicle to follow in an area other than the front side, there is no need for distance measurement in such area.

With the function of anti-collision (anti-collision 802), since the appropriate distance between two cars is required by measuring the distance from one's vehicle to the preceding vehicle even while rounding a curve, distance needs to be measured for an area around the front side, which is a wider view angle in comparison to the car-following 801. Nevertheless, since a vehicle with which a collision may occur is located at a relatively close distance, distance measurement does not need to be as accurate as the car-following 801. Moreover, since the existence range of an object with which a collision may occur of the wide angle side of the anti-collision 802 will be limited to a close distance in comparison to the narrow angle side, the graph of the anti-collision 802 will rise to the right. Furthermore, since it is unlikely that a collision will occur due to a curve in a wide angle area that is wider than the area around the front side, there is no need for distance measurement in such area.

With the anti-collision function (anti-collision 803) in which the traveling direction is substantially orthogonal such as at an intersection, since it is necessary to detect a person or a vehicle that darts out from the lateral direction, images needs to be captured at the widest view angle possible. Nevertheless, similar to the anti-collision 802, since the person or vehicle with which a collision may occur is located at a relatively close distance, distance measurement does not need to be as accurate as the car-following 801. However, unlike the anti-collision 802, since the object, even if it exists on the wide angle side, will head toward the path of one's vehicle in the anti-collision 803, it is necessary to also measure objects that are relatively far. Moreover, when the distance to the intersection is a predetermined value, since the distance to the object on the wide angle side of the anti-collision 803 will be farther in comparison to the narrow angle side, the graph of the anti-collision 803 will fall to the right.

As described above, the range that needs to be detected will differ depending on the usage to be realized. When the distance measuring system is to be equipped in a vehicle for the foregoing purposes, the tendency is that, generally speaking, images on the front side need to be captured with a far distance and images in the peripheral direction need to be captured at a wide view angle.

Figure 8:
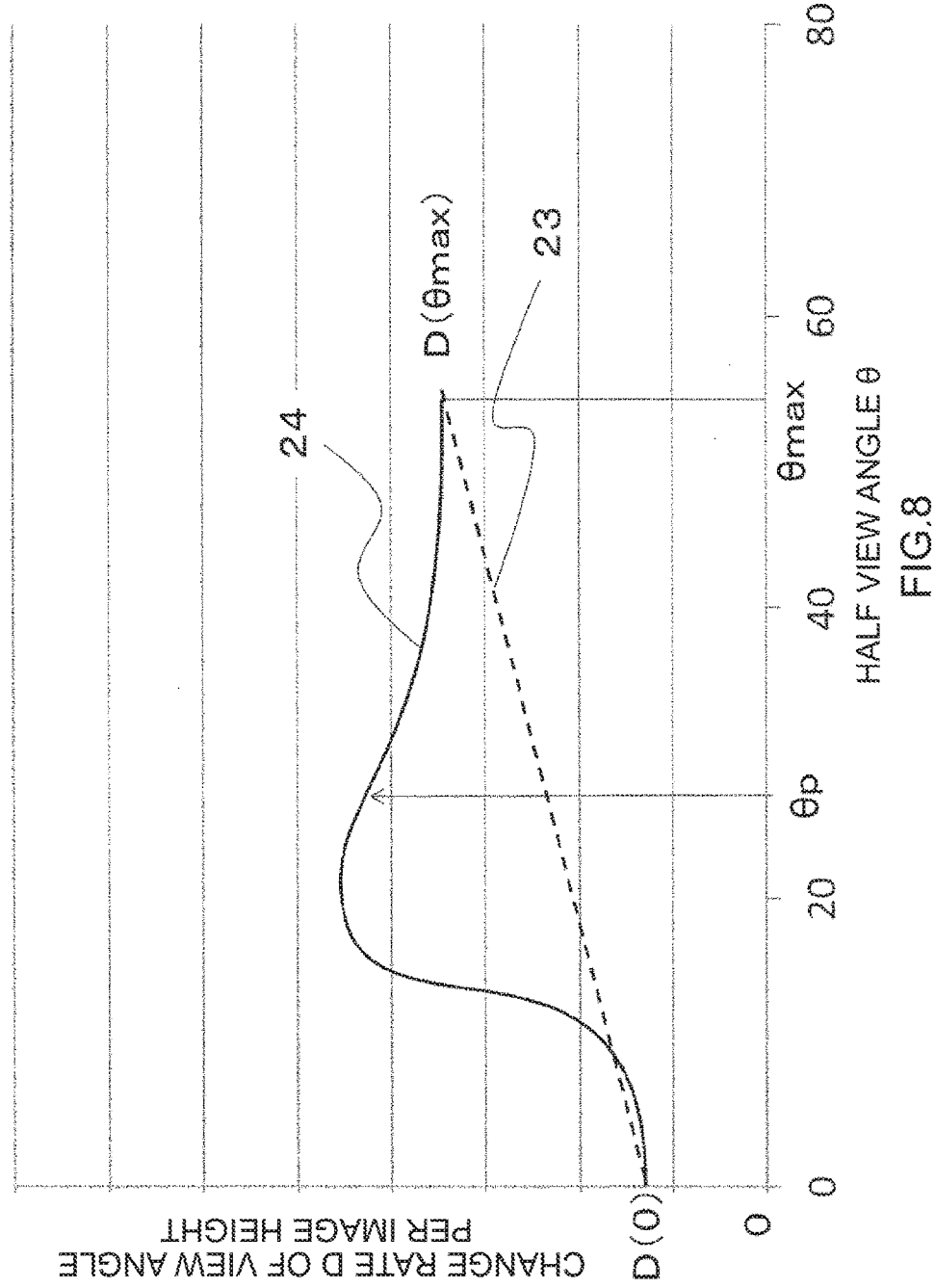
FIG. 8 is an example of the angular resolution of the optical system according to the first embodiment.

FIG. 8 shows an example of the configuration of the optical system of this embodiment. The straight lines of 801 to 803 represent the car-following 801, the anti-collision 802, and the anti-collision 803 of FIG. 7, and reference numeral 24 represents an example of the rate of change of the view angle of the optical system according to the first embodiment. The rate of change 24 of the view angle is designed so that the rate of change D of the view angle per image height will be smaller than the car-following 801, the anti-collision 802, and the anti-collision 803 at all view angles.

In other words, the rate of change 24 of the view angle is designed so that the rate of change of the view angle will increase in order from the center part of the lens, the part around the center located outside the center part of the lens, and the outer peripheral part located outside the part around the center of the lens. The division of the center part, the part around the center, and the outer peripheral part are from 0 degrees to roughly 20 degrees, from roughly 20 degrees to roughly 30 degrees, and roughly 30 degrees or more in the diagram, but the division is not particularly limited thereto, and so as long as the required characteristics explained with reference to FIG. 7 are different, the part around the center may be accordingly set, for instance, to be from 30 degrees to 40 degrees, and the division may be revised as needed.

Moreover, while the distance measurement can be performed with high precision when the rate of change D of the view angle is small, many pixels of the imaging element 32 will be consumed. In other words, in order to suppress the required resolution of the imaging element 32 while maintaining a wide image capture view angle, it would be effective to increase the rate of change D of the view angle within a range that the rate of change D of the view angle satisfies the angular resolution required across the maximum view angle from the front side of the imaging visual field. This embodiment offers an example of a configuration that satisfies the foregoing condition.

According to this embodiment, in the imaging optical system 31, the rate of change of the image height per view angle, i.e. dy/dθ, is greater than 0 at a maximum view angle θmax, and the rate of change D is greater than the straight line 23 which connects D(0) and D(θmax) at a predetermined θp.

In other words, θp, which satisfies an expression D(θp) >{(D(θmax)−D(0))/θmaxθ}θp+D(0), lies in a range of 0<θ<θmax.

By increasing the rate of change D(θ) of the view angle, an effect of preventing the increase in the image height is yielded. Furthermore, the rate of change 24 of the view angle of the optical system of this embodiment has an area that is smaller than the straight line 23 near θ=0. In other words, the rate of change 24 of the view angle can capture images at a wide view angle since it has an angular resolution that is higher than the straight line 23 in the area with a narrow view angle near θ=0, and the ratio that the image height will increase is suppressed in the peripheral areas. Since the rate of change of the view angle is greater than 0 even when the maximum view angle θ=θmax, the position information of the imaging target will not be optically lost even at a maximum view angle.

As described above, according to the optical system which adopts the configuration of this embodiment, it is possible to realize an optical system having a view angle area which emphasizes angular resolution and a view angle area where the rate of change of the image height is suppressed in comparison to an optical system which changes monotonously as with the straight line 23, and, therefore, it is possible to capture images at a high resolution in certain view angle areas while securing the wide image capture range.

Moreover, in cases where the rate of change 24 of the view angle of this embodiment has a vertex, the angular resolution will decrease in the range area where the vertex exists, but images can be captured at a wide view angle while increasing the angular resolution of the center part and the peripheral part.

When the optical system of this embodiment in which the rate of change 24 of the view angle has a vertex is used in a device to be mounted in a vehicle, the vertex desirably exists in a range from 20° to 30°. The detection distance required for each view angle based on usage such as for supporting the driving of drivers or realizing autonomous driving is short in the area from 20° to 30°. Thus, as shown in FIG. 8, at a view angle of 20° to 30°, the angular resolution is tolerated even if it is small, and, when the angular resolution in that area is reduced and the increase in the image height is suppressed, it is possible to provide a distance measuring system capable of capturing images at a wide view angle while performing distance measurement relatively accurately in the center area with a small view angle, and the peripheral areas.

Embodiment 2

Figure 9:
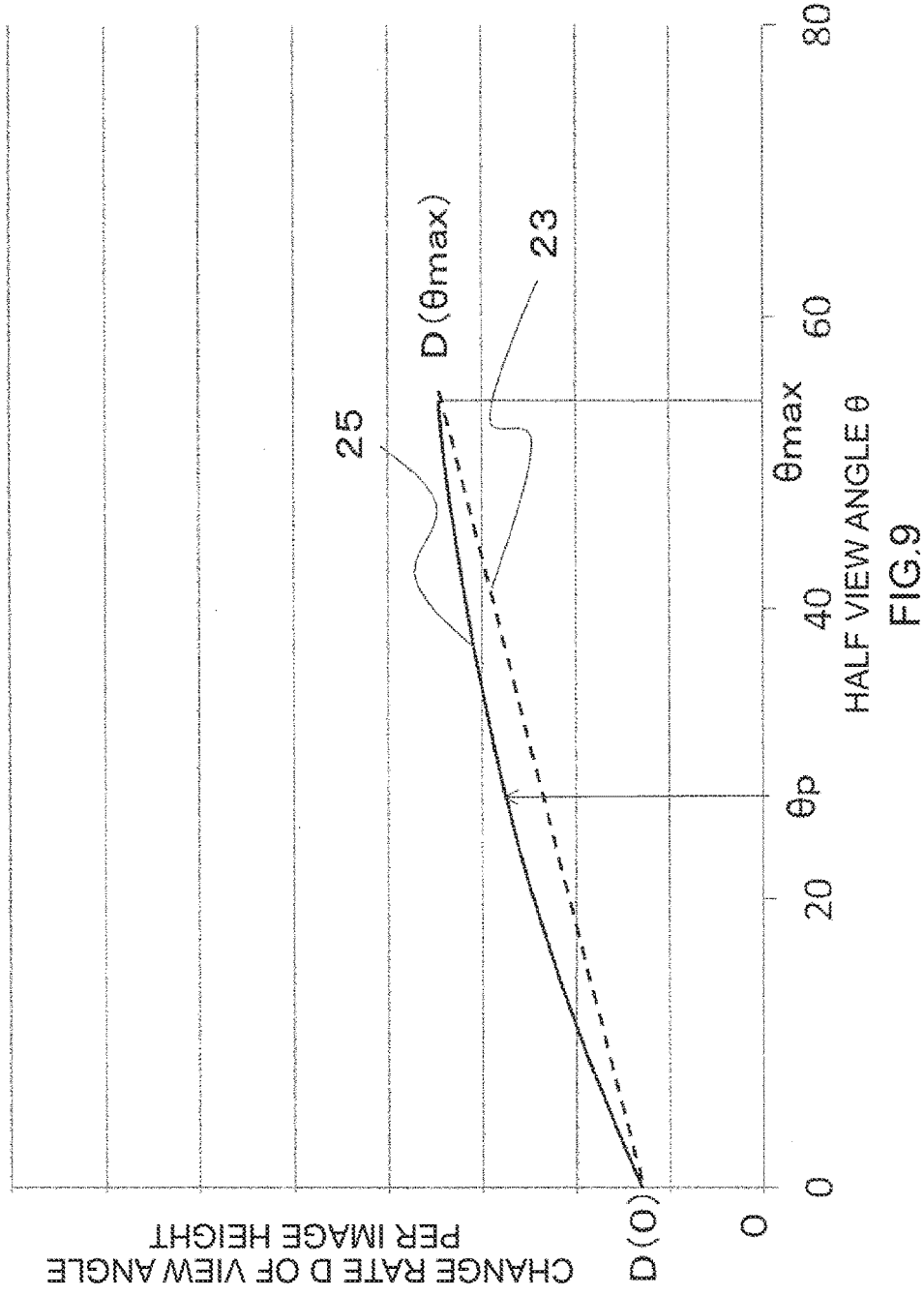
FIG. 9 is an example of the angular resolution of the optical system according to the second embodiment.

A configuration example of the second embodiment of the present invention is now explained. FIG. 9 is an example of the angular resolution of the optical system according to the second embodiment. Since the optical properties of the optical system in the first embodiment are complex, the design of the optical system also tends to become complex. Thus, this embodiment will explain a simpler optical system which yields the same effects as the first embodiment.

According to the optical system of this embodiment, in the imaging optical system 31, the rate of change of the image height per view angle, i.e. $dy/d\theta$, is greater than 0 at a maximum view angle $\theta$max, the rate of change of the view angle per image height, i.e. $D(\theta)=1/(dy(\theta)/d\theta)$, satisfies an expression $D(\theta p)>\{(D(\theta max)-D(0))/\theta max\theta\}\theta p+D(0)$, with $\theta p$ which lies in a range of $0<\theta p<\theta max$; and $D(\theta)$ does not have a vertex in the foregoing range.

When the rate of change $D(\theta)$ of the view angle has a vertex, the angular resolution will decrease in the range area where the vertex exists. However, by configuring the optical system so that $D(\theta)$ does not have a vertex as described above, since the angular resolution is monotonously increased across the entire range of the view angle from 0 to the maximum view angle $\theta$max, an effect is yielded in that it is possible to obtain a view angle area that is effective for continuous distance measurement from the center part to the peripheral parts.

When using the optical system of this embodiment in the distance measuring system, since the continuity of view angles that enable distance measurement is guaranteed, an effect is yielded in that it is possible to simplify the algorithm of the distance calculation unit of the distance measuring system and improve the robustness of the system.

Embodiment 3

Figure 10:
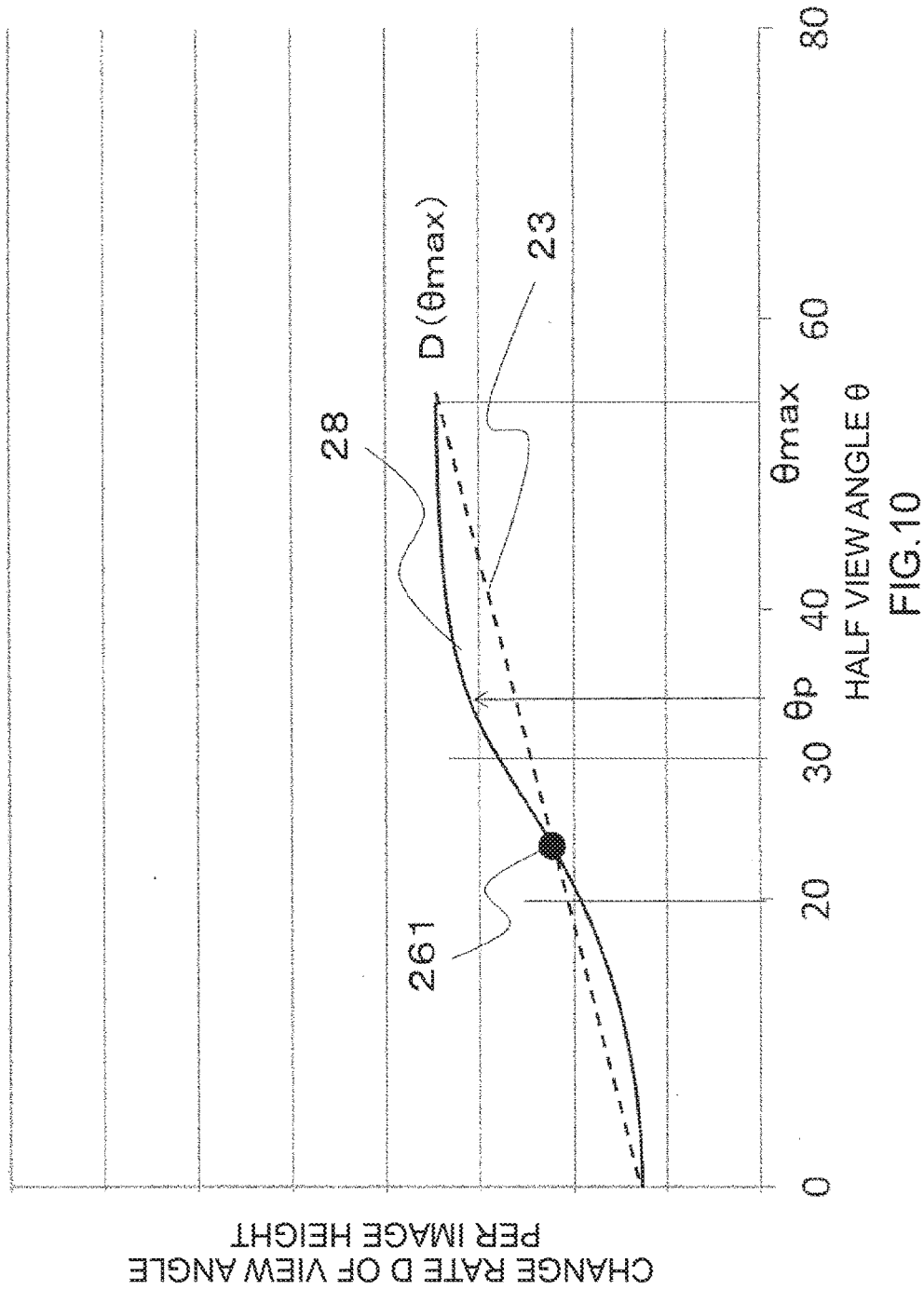
FIG. 10 is an example of the angular resolution of the optical system according to the third embodiment.

A configuration example of the third embodiment of the present invention is now explained. FIG. 10 is an example of the angular resolution of the optical system according to the third embodiment. Based on the optical properties of the second embodiment, the same effects as the first embodiment can be yielded with a simpler optical system, but the effects of the second embodiment will deteriorate considerably in comparison to the first embodiment. Thus, this embodiment will explain an optical system which yields effects that are better than the second embodiment but with a design that is simpler than the first embodiment by causing the optical properties of the optical system to be complex in comparison to the second embodiment.

According to the optical system of this embodiment, in the imaging optical system 31, the rate of change of the image height per view angle, i.e. $dy/d\theta$, is greater than 0 at a maximum view angle $\theta$max, the rate of change of the view angle per image height, i.e. $D(\theta)=1/(dy(\theta)/d\theta)$, is satisfies an expression $D(\theta p)>\{(D(\theta max)-D(\theta))/\theta max\theta\}\theta p+D(0)$, with $\theta p$ which lies in a range of $0<\theta<\theta max$;

$D(\theta)$ does not have a vertex in the foregoing range; and the optical system has at least one or more inflection points.

Since the rate of change 26 of the view angle of the optical system of this embodiment has an inflection point 261, it is possible to suppress the increase in the view angle near $\theta=\theta$max while highly maintaining the angular resolution near $\theta=0°$. Accordingly, while effective view angle areas are in succession, a relatively high standard angular resolution can be obtained at the respective areas at the center near $\theta=0°$ and the periphery near $\theta=\theta$max, and the transition region of the angular resolution can be reduced around the inflection point. According to the optical system which adopts the configuration of this embodiment, it is possible to provide a distance measuring system capable of capturing images at a wide view angle while having a high angular resolution in the center view angle area and the peripheral view angle areas.

Furthermore, when the optical system of this embodiment is used in a device to be mounted in a vehicle, the switching view angle $\theta s$, which is a view angle with the inflection point 316 of the rate of change of the view angle per image height, desirably exists in a range from 20° to 30°. This is because the detection distance required for each view angle based on usage such as for supporting the driving of drivers or realizing autonomous driving is short in an area from 20° to 30°, and the recognition accuracy of images is tolerated even if it decreases due to the transition of the view angle magnification at a view angle of 20° to 30°.

Embodiment 4

Figure 11:
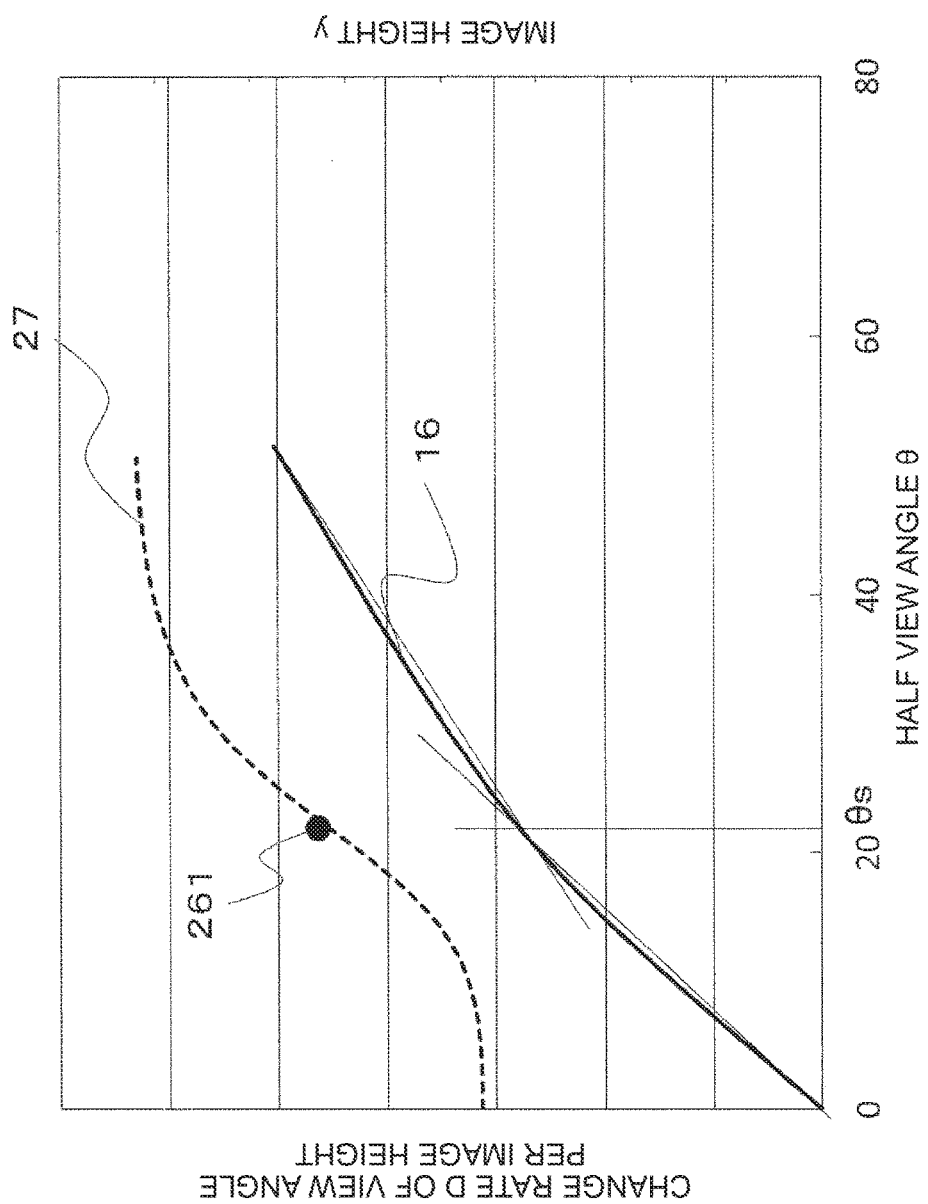
FIG. 11 is an example of the relationship of the angular resolution, the view angle and the image height of the optical system according to the fourth embodiment.

A configuration example of the fourth embodiment of the present invention is now explained. FIG. 11 is an example of the relationship of the angular resolution, the view angle and the image height of the optical system according to the fourth embodiment, wherein reference numeral 16 represents the relationship of the view angle and the image height of this embodiment, and reference numeral 27 represents the view angle and the rate of change of the view angle.

The optical system of this embodiment is an application of the optical system of the first to third embodiments, and the image height $y(\theta)$ satisfies an expression $1.5<(y(\theta s)/\theta s)/\{(y(\theta max)-y(\theta s))/(\theta max-\theta s)\}<3.0$ relative to the switching view angle $\theta s$ of the rate of change $D(\theta)$ of the view angle per image height.

When the optical system which adopts the configuration of this embodiment is used in a device to be mounted in a vehicle, the detection distance required for each view angle based on usage such as for supporting the driving of drivers or realizing autonomous driving is long at the center and short in the peripheral direction. Thus, for example, when an imaging element having a resolution of 3M pixels is used, when it is $(y(\theta s)/\theta s)/\{(y(\theta max)-y(\theta s))/(\theta max-\theta s)\}<1.5$, it will not be possible to converge the light that enters the lens from a half view angle of 90 degrees in the area where the imaging element exists, and the image of the required area cannot be obtained. Moreover, when it is $3.0<(y(\theta s)/\theta s)/\{(y(\theta max)-y(\theta s))/(\theta max-\theta s)\}$, images can be captured at a wide angle area, but the angular resolution of the images will deteriorate, and the precision of the object distance will be insufficient.

Thus, according to the optical system having the configuration of this embodiment, it is possible to provide a distance measuring system capable of capturing images at a wide view angle where the object distance is long in an area where the view angle is small and the object distance is short in the peripheral areas.

Figure 12:
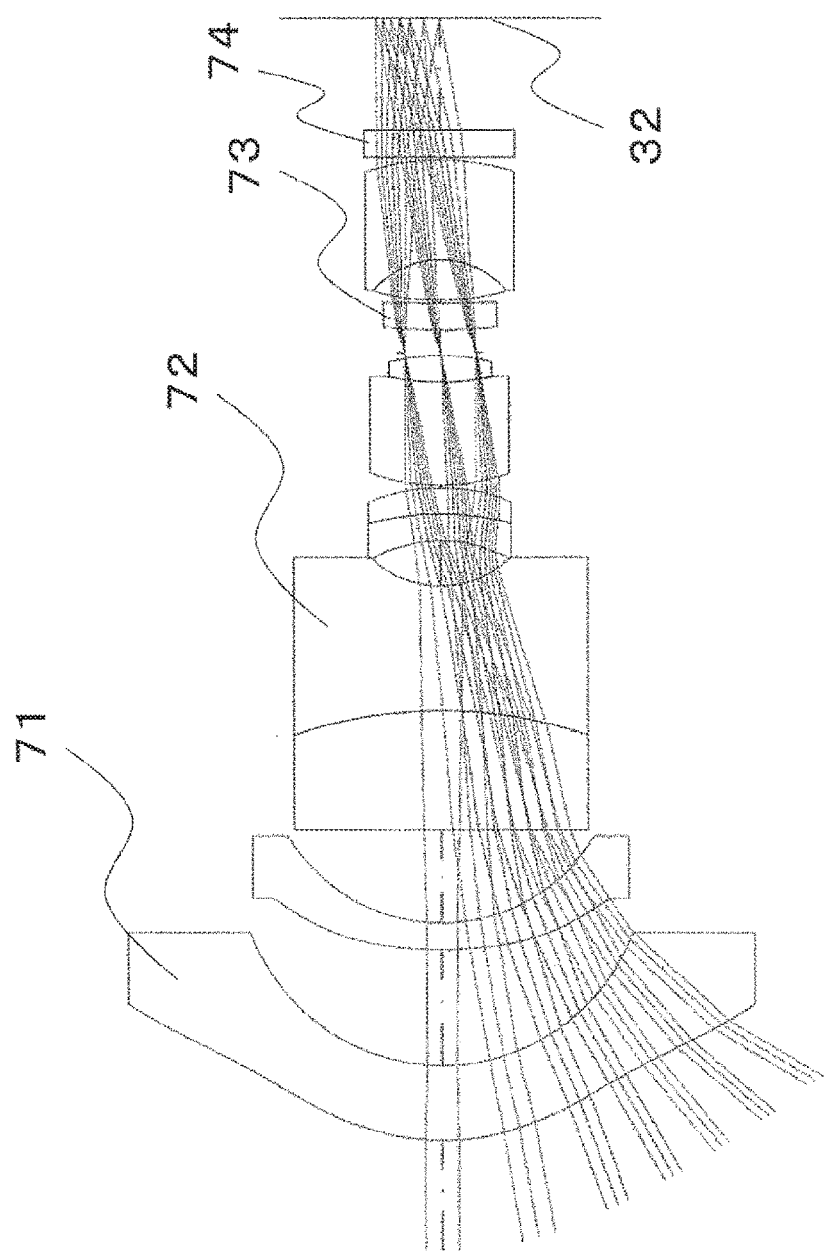
FIG. 12 is an example of the lens having the angular resolution of the optical system according to the fourth embodiment.

An example of the optical system having the angular resolution of this embodiment is now explained with reference to FIG. 12. The optical system is configured from spherical lenses and anspherical lenses. The lens that is nearest to the imaging object side is configured from two meniscus lenses 71 having an anspherical convex surface and a spherical concave surface, as well as four cemented lenses 72 and one spherical lens 73, and a polarizer 74 for shielding prescribed unneeded polarization. These lenses may be configured from glass to give preference to weather resistance, or configured from plastic to give preference to workability and cost. Moreover, the various optical components may also be subject to AR coating to ensure transmittance. These lenses and optical components are positioned and fixed by using a lens barrel and spacers. These are desirably made from metal or materials with moderate rigidity so that the positions of the optical components will not shift due to vibrations or external shock.

While the present invention was explained on the assumption that it would be used for an in-vehicle stereo camera, the optical system of the present invention and the image capturing device equipped in the optical system of the present invention may also be used in other fields. For example, when the present invention is used in a security camera, the present invention would yield the effect of realizing a wide visual field capable of overlooking the entire front section of the camera and, upon detecting a notable object, capturing a detailed image of the object in a high resolution by capturing the object at the front of the camera. Note that the present invention is not limited to the foregoing embodiments, and includes various modified examples. For instance, the foregoing embodiments were explained in detail for facilitating the understanding of the present invention, and the present invention is not limited to a configuration comprising all of the components explained above. Moreover, a part of the configuration of a certain embodiment may also be replaced with the configuration of another embodiment. Moreover, the configuration of a certain embodiment may also be added to the configuration of another embodiment. Moreover, a part of the configuration of each embodiment may be added with, deleted from, or replaced by another configuration.

REFERENCE SIGNS LIST

11 . . . perspective projection, 12 . . . orthogonal projection, 21 . . . rate of change of view angle of perspective projection, 22 . . . rate of change of view angle of orthogonal projection, 23 . . . rate of change of view angle expressed by $\{(D(\theta max)-D(0))/\theta max\ \theta\}\theta p+D(0)$, 24 . . . rate of change of view angle of first embodiment, 25 . . . rate of change of view angle of second embodiment, 26 . . . rate of change of view angle of third embodiment, 261 . . . inflection point, 27 . . . rate of change of view angle of fourth embodiment, 28 . . . rate of change of view angle of fifth embodiment, 3 . . . imaging means, 31 . . . imaging optical system, 32 . . . imaging element, 4 . . . image processing unit, 5 . . . distance calculation unit, 6 . . . body, 71 . . . meniscus lens, 72 . . . cemented lens, 73 . . . spherical lens, 74 . . . polarizer, 80 . . . object

The invention claimed is:

1. An optical system for imaging an object, the optical system comprising:
   two or more imaging lenses having an anspherical convex surface and a spherical concave surface on which light emitted from the object is incident,
   a plurality of pairs of cemented lenses that receive light from the two or more imaging lenses;
   a spherical lens that receives light from the plurality of cemented lenses, and
   a polarizer that receives light from the spherical lens to form an image,
   wherein:
      $\theta$ is a half view angle of the optical system,
      D is a distance from the object to the optical system,
      $y(\theta)$ is an image height of the image,
      $D(\theta)=1/(dy(\theta)/d\theta$ is a rate a rate of change of the view angle per image height,
      $dy/d\theta$ is a rate of change of the image height per view angle,
      $\Theta s$ is a switching view angle of the rate of change of the view angle per image height,
      $dy/d\theta$, is greater than 0 at a maximum view angle $\theta max$ of the optical system,
      $D(\theta)=1/(dy(\theta)/d\theta)$, satisfies $D(\theta p)>\{(D(\theta max)-D(0))/\theta max\theta\}\theta p+D(0)$, with $\theta p$ which lies in a range of $0<\theta<\theta max$, and
      $Y(\theta)$ satisfies $1.5<(y(\theta s)/\theta s)/\{(y(\theta max)-y(\theta s))/(\theta max-\theta s)\}<3.0$.

2. An optical system for imaging an object, the optical system comprising:
   two or more imaging lenses having an anspherical convex surface and a spherical concave surface on which light emitted from the object is incident,
   a plurality of pairs of cemented lenses that receive light from the two or more imaging lenses;
   a spherical lens that receives light from the plurality of cemented lenses, and
   a polarizer that receives light from the spherical lens to form an image,
   wherein:
      $\theta$ is a half view angle of the optical system,
      D is a distance from the object to the optical system,
      $y(\theta)$ is an image height of the image,
      $D(\theta)=1/(dy(\theta)/d\theta$ is a rate a rate of change of the view angle per image height,
      $dy/d\theta$ is a rate of change of the image height per view angle,
      $\Theta s$ is a switching view angle of the rate of change of the view angle per image height,
      $dy/d\theta$, is greater than 0 at a maximum view angle $\theta max$ of the optical system,
      $D(\theta)=1/(dy(\theta)/d\theta)$, satisfies $D(\theta p)>\{(D(\theta max)-D(0))/\theta max\theta\}\theta p+D(0)$, with $\theta p$ which lies in a range of $0<\theta<\theta max$,
      $D(\theta)$ does not have a vertex, and
      $y(\theta)$ satisfies $1.5<(y(\theta s)/\theta s)/\{(y(\theta max)-y(\theta s))/(\theta max-\theta s)\}<3.0$.

3. An optical system for imaging an object, the optical system comprising:
- two or more imaging lenses having an anspherical convex surface and a spherical concave surface on which light emitted from the object is incident,
- a plurality of pairs of cemented lenses that receive light from the two or more imaging lenses;
- a spherical lens that receives light from the plurality of cemented lenses, and
- a polarizer that receives light from the spherical lens to form an image, wherein:
- $\theta$ is a half view angle of the optical system,
- D is a distance from the object to the optical system,
- $y(\theta)$ is an image height of the image,
- $D(\theta)=1/(dy(\theta)/d\theta$ is a rate a rate of change of the view angle per image height,
- $dy/d\theta$ is a rate of change of the image height per view angle,
- $\Theta s$ is a switching view angle of the rate of change of the view angle per image height,
- $dy/d\theta$, is greater than 0 at a maximum view angle $\theta max$ of the optical system,
- $D(\theta)=1/(dy(\theta)/d\theta)$, satisfies $D(\theta p) > \{(D(\theta max)-D(0))/\theta max\theta\}\theta p+D(0)$, with $\theta p$ which lies in a range of $0<\theta<\theta max$,
- $y(\theta)$ satisfies $1.5<(y(\theta s)/\theta s)/\{(y(\theta max)-y(\theta s))/(\theta max-\theta s)\}<3.0$,
- $D(\theta)$ does not have a vertex, and
- the optical system has at least one or more inflection points.

4. The optical system according to claim 1, wherein: satisfies $10°<\theta s<30°$.

5. The optical system according to claim 1; further comprising
an imaging element that captures the image of the object.

6. The optical system according to claim 5, further comprising:
a distance calculator that receives two or more images from the imaging element and calculates the distance from the object to the optical system based on the two or more images.

* * * * *